(12) United States Patent
Pool et al.

(10) Patent No.: US 7,914,251 B2
(45) Date of Patent: Mar. 29, 2011

(54) LINER PANEL

(75) Inventors: Clare L. Pool, Derby (GB); Cedric B. Harper, Derby (GB); Geoffrey R. Attewell, Leicester (GB)

(73) Assignee: Rolls-Royce, PLC, London (GB)

( * ) Notice: Subject to any disclaimer, the term of this patent is extended or adjusted under 35 U.S.C. 154(b) by 916 days.

(21) Appl. No.: 11/798,253

(22) Filed: May 11, 2007

(65) Prior Publication Data

US 2007/0297910 A1 Dec. 27, 2007

(51) Int. Cl.
*F01D 25/24* (2006.01)
(52) U.S. Cl. .......................................... 415/9; 415/119
(58) Field of Classification Search ................ 415/121.2, 415/9, 119, 174.4
See application file for complete search history.

(56) References Cited

U.S. PATENT DOCUMENTS 5,344,280 A * 9/1994 Langenbrunner et al. ........ 415/9

FOREIGN PATENT DOCUMENTS

| EP | 0 795 682 A1 | 9/1997 |
| EP | 1 087 104 A2 | 3/2001 |
| EP | 1 589 195 A1 | 10/2005 |

OTHER PUBLICATIONS

Feb. 9, 2009 European Search Report issued in EP 07 25 1986.

* cited by examiner

*Primary Examiner* — Edward Look
*Assistant Examiner* — Dwayne J White
(74) *Attorney, Agent, or Firm* — Oliff & Berridge, PLC

(57) ABSTRACT

A liner panel for a fan casing of a gas turbine engine includes a honeycomb layer, a septum layer and an abradable layer. The fan casing is provided with a containment system in case of fan blade failure. In use, ice may be released from a fan blade in a first direction, and (in the case of a blade-off event) a fan blade or part of a fan blade may be released in a second direction. The panel has a compressive strength greater in the first direction than in the second direction such that the released ice will be deflected by the panel but the released fan blade or part of a fan blade will pass through the panel.

14 Claims, 5 Drawing Sheets

LINER PANEL

BACKGROUND

This invention relates to gas turbine engines. More specifically, it relates to the liner panels disposed within the fan casing of a gas turbine engine.

Conventionally, the fan blades of a gas turbine engine rotate within an annular layer of abradable material, known as a fan track, within the fan casing. In operation, the fan blades cut a path into this abradable layer, minimising leakage around the blade tips.

The fan casing itself incorporates a containment system, designed to contain any released blades or debris if a fan blade should fail for any reason. The strength and compliance of the fan casing must be precisely calculated to absorb the energy of the resulting debris. It is therefore essential that the fan track should not interrupt the blade trajectory in a blade-off event, and therefore the fan track must be relatively weak so that any released blade or blade fragment can pass through it essentially unimpeded to the containment system.

Rearward of the fan track, there is conventionally provided an annular ice impact panel. This is typically a glass-reinforced plastic (GRP) moulding, or a tray of some other material wrapped with GRP to increase its impact strength. Ice that forms on the fan blades is acted on by centrifugal and airflow forces, which respectively cause it to move outwards and rearwards before being shed from the blade. The geometry of a conventional fan blade is such that the ice is shed from the trailing edge of the blade, and it will strike the ice impact panel rearward of the fan track. The ice will bounce off, or be deflected by, the ice impact panel without damaging the panel.

Swept fan blades have a greater chord length at their central portion than conventional fan blades. Because of this, ice that forms on such a blade, although it follows the same rearward and outward path as on a conventional blade, may reach the radially outer tip of the blade before it reaches the trailing edge. It will therefore be shed from the blade tip and strike the fan track.

However, a conventional fan track is not strong enough to tolerate ice impact, and so conventional arrangements are not suitable for use with swept fan blades. It is not possible simply to strengthen the fan track to accommodate ice impact, because this would disrupt the blade trajectory during a blade-off event, and compromise the operation of the fan casing containment system.

It is an object of this invention to provide a liner panel able to be located directly outward of the fan blades, combining the abradable liner necessary for the fan track with suitable mechanical properties both for the ice impact and for the blade containment functions.

SUMMARY

Accordingly, the invention provides a liner panel for an annular fan casing of a gas turbine engine as described herein.

BRIEF DESCRIPTION OF THE DRAWINGS

Embodiments of the invention will now be described in more detail, with reference to the attached drawings, in which.

BRIEF DESCRIPTION OF EMBODIMENTS

Figure 1:
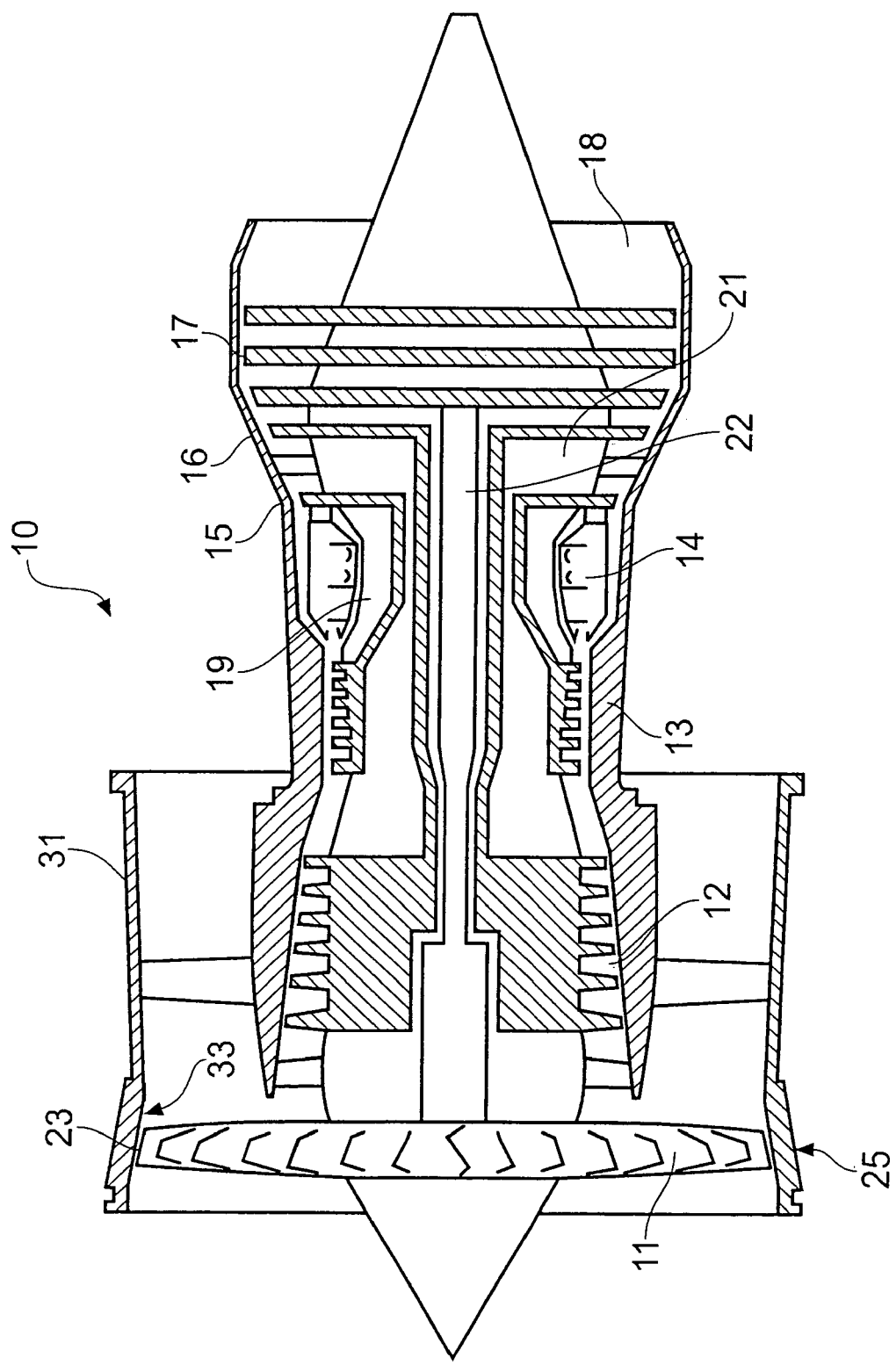
FIG. 1 shows a section through a gas turbine engine of known type.

FIG. 1 shows a gas turbine engine 10, of conventional configuration. It comprises in axial flow series a fan 11, intermediate pressure compressor 12, high pressure compressor 13, combustor 14, high, intermediate and low pressure turbines 15, 16 and 17 respectively and an exhaust nozzle 18.

Air is accelerated by the fan 11 to produce two flows of air, the outer of which is exhausted from the engine 10 to provide propulsive thrust. The inner flow of air is directed into the intermediate pressure compressor 12 where it is compressed and then directed into the high pressure compressor 13 where further compression takes place.

The compressed air is then mixed with fuel in the combustor 14 and the mixture combusted. The resultant combustion products then expand through the high, intermediate and low pressure turbines 15, 16, 17 respectively before being exhausted to atmosphere through the exhaust nozzle 18 to provide additional propulsive thrust. The high, intermediate and low pressure turbines 15, 16, 17 drive, respectively, the high and intermediate pressure compressors 13, 12 and the fan 11 via concentric drive shafts 19, 21, 22.

For efficient operation of the gas turbine engine, it is important that the gap 23 between the tips of the fan 11 blades and the fan casing 31 is as small as possible, to minimise leakage. To achieve this, the fan casing typically has an abradable liner 25, comprising a layer of material which can be abraded by the tips of the fan 11 blades as they rotate. In this way, the fan blades cut a path, with a minimum clearance, in which to run.

A second, but equally important, function of the fan casing in the region radially outward of the abradable liner 25 is to provide a containment system. This must absorb the energy of a released fan blade and any other debris, in a blade-off event. The energy absorption must be very carefully tailored to ensure that no material is released outward or forward of the engine, and that the material retained within the engine will cause minimal damage further downstream.

In use, ice can build up on the blades of the fan 11. The combination of centrifugal and gas loading causes pieces of ice to move radially outward and rearward (towards the right, in FIG. 1) until they are released from the blade at its trailing edge. An ice impact panel is provided at the location marked 33 on the inside of the fan casing 31. This ice impact panel, commonly made of (or wrapped in) glass-reinforced plastic (GRP), absorbs the energy of the released ice so that it will not damage components further downstream in the engine.

Figure 2:
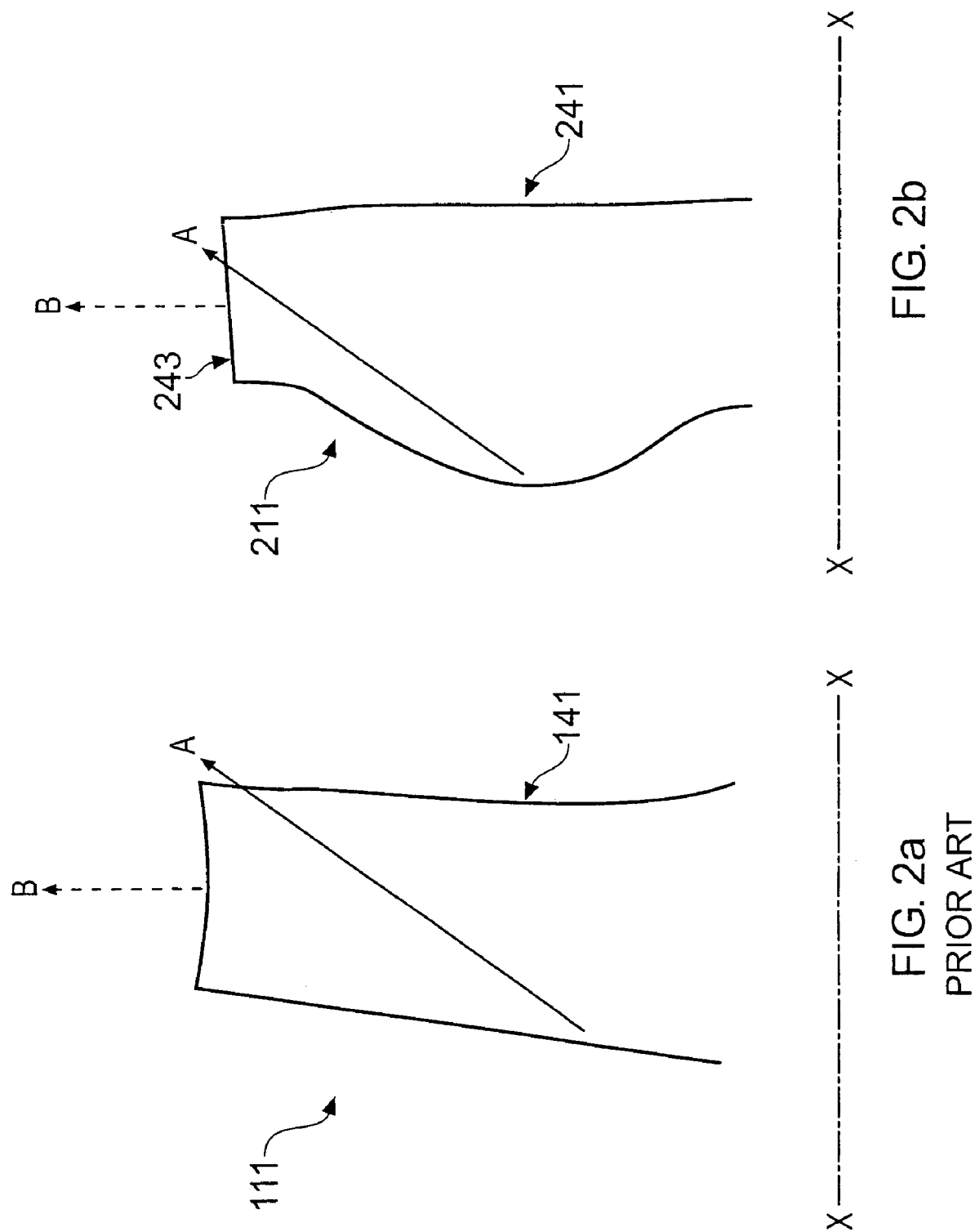
FIG. 2a shows a conventional fan blade of a gas turbine engine.
FIG. 2b shows a swept fan blade of a gas turbine engine.

FIG. 2a shows a conventional fan blade 111. A circumferential array of such blades rotates in use about an axis X-X. The arrow A shows a notional path followed by a piece of ice across the surface of the blade 111. The ice is released from the trailing edge 141 of the blade 111. In a blade-off event, part or all of a fan blade is abruptly released. The trajectory of the released blade is not significantly affected by gas loads, and so it moves essentially in a radially outward direction, as shown by the dashed arrow B.

FIG. 2b shows a swept fan blade 211. The swept design of blade is increasingly favoured in the gas turbine industry as it offers significant advantages in efficiency over the conventional blade 111 shown in FIG. 2a. The arrow A shows a notional path followed by a piece of ice across the surface of the blade 211. This path is essentially the same as the path A followed by the ice across the surface of the conventional fan blade 111. Likewise, the trajectory B of a released fan blade or blade fragment is essentially the same as the trajectory B in FIG. 2a. However, it can be seen in FIG. 2b that the greater chordal dimension of the swept blade 211 can cause ice to be released at the tip 243 of the blade, rather than at the trailing edge 241. With a conventional fan casing arrangement, as shown in FIG. 1, this ice would then strike the fan track rather than the ice impact panel. The problem is that the energy of impact of the ice may be greater than the energy of impact of a released blade or blade fragment. The fan casing arrangement must therefore have the mutually contradictory properties that it will permit a released fan blade, or blade fragment, to pass through essentially unimpeded to the containment system, and yet will deflect released ice having a higher energy of impact. No known arrangement can provide this combination of properties.

It is therefore an object of this invention to provide a liner panel for an annular fan casing of a gas turbine engine that will substantially overcome the problem outlined above.

Figure 3:
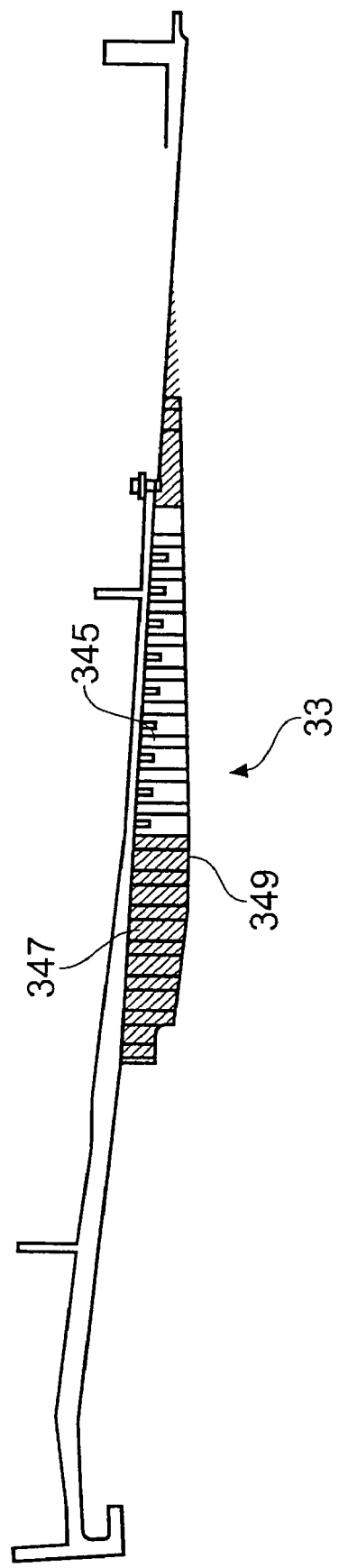
FIG. 3 shows an ice impact panel of known type.

FIG. 3 shows in more detail an ice impact panel of conventional design, as introduced in FIG. 1.

The ice impact panel, shown generally at 33, is located within the fan casing 31. It comprises an aluminium honeycomb 345, part of which is filled by a low-density epoxy filler 347. The aluminium honeycomb 311 is covered by a glass-fibre wrap 349.

Figure 4:
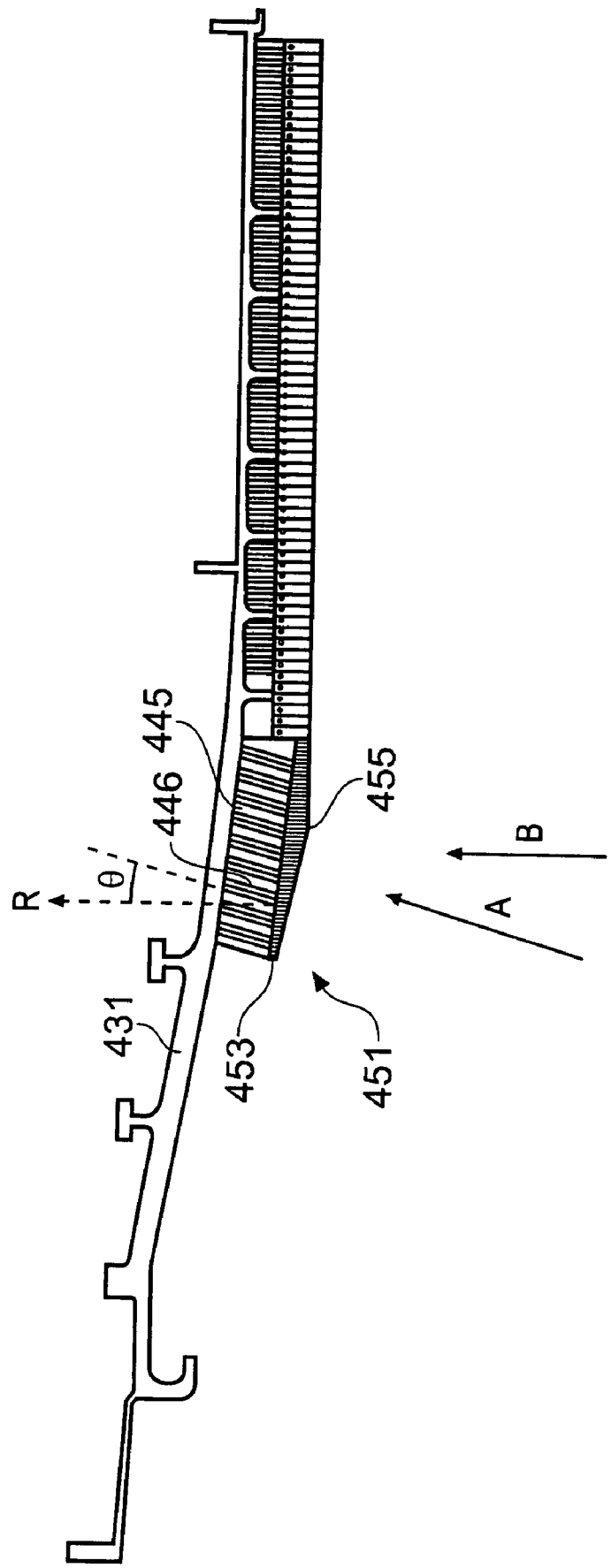
FIG. 4 shows a first embodiment of a liner panel according to the invention.

FIG. 4 shows a first embodiment of a liner panel 451 according to the invention. An aluminium honeycomb 445, with a density less than 160 kg/m³ (approximately 10 lb/ft³) is secured to the fan case 431, using a known epoxy adhesive. In use, the liner panel 451 would be mounted radially outward of an array of fan blades 211, as shown in FIG. 2b.

The cell walls 446 of the honeycomb 445 are skewed, in the axial direction, at an angle θ of 10 degrees to the radial direction R of the engine. The cell walls 446 are therefore parallel to the expected ice impact direction A. As in FIGS. 2a and 2b, the expected impact direction for a released blade or blade fragment, B, is approximately parallel to the radial direction R.

A septum layer 453 is secured to the honeycomb 445 and to this is secured in turn an abradable liner 455. The abradable liner 455 comprises a honeycomb made of aramid paper dipped in phenolic resin (an example of such a honeycomb material is the NOMEX® range of products produced by the DuPont company). The cells of the honeycomb are filled with a closed-cell expanding syntactic epoxy. Such a construction is well-known in the art. The closed-cell expanding syntactic epoxy is an abradable material having a Shore D hardness less than substantially 70.

The abradable liner 455 provides a fan track into which, in use, the tips of the fan blades 211 can cut a path.

The aluminium honeycomb 445, in common with other known honeycomb materials, has highly directional mechanical properties. In particular, its maximum compressive strength is in the direction of the cell walls. Therefore it has sufficient strength in the direction A to absorb the impact energy of any ice that is released from the fan blades. The ice will therefore be deflected by the panel back into the gas stream. However, its strength in the direction B is not sufficient to affect significantly the trajectory of a released fan blade, and so its presence will not interfere with the correct operation of the containment system. A released fan blade or blade fragment will pass straight through the abradable liner 455 and the honeycomb 445, to the containment system beyond (not shown). This is because an impact in direction A must exceed the buckling strength of the honeycomb to cause it to collapse, whereas an impact in direction B need only exceed the (lower) bending strength of the honeycomb to collapse it.

Figure 5:
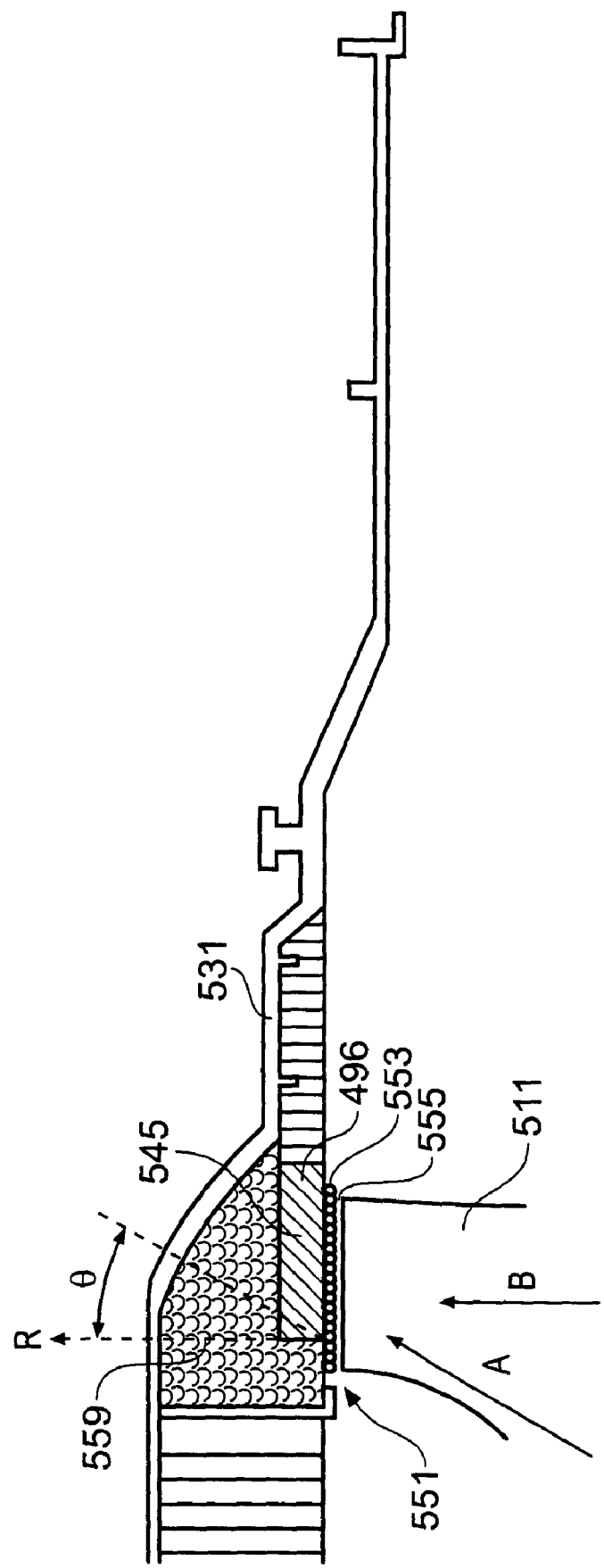
FIG. 5 shows a second embodiment of a liner panel according to the invention.

FIG. 5 shows a second embodiment of an ice impact panel according to the invention. In this embodiment, a fan casing 531 surrounds an array of fan blades 511, of which one is shown. Radially outward of the fan blade 511 tip is a liner panel according to the invention, shown generally at 551.

The liner panel 551 comprises an aluminium honeycomb 545, secured to a containment system 559 of known type within the casing 531. The cell walls 546 of the honeycomb are at an angle θ to the radial direction R of the engine.

As in the embodiment of FIG. 4, a septum layer 553 is secured radially inward of the honeycomb 545, and an abradable liner 555 is similarly secured radially inward of the septum layer 553.

It will be seen that angle of the cell walls 546 of the aluminium honeycomb 545 is parallel to the expected impact direction (shown by the arrow A) of any ice released from the fan blades 511. As in the embodiment of FIG. 4, therefore, its maximum compressive strength is in the direction of the cell walls. Therefore it has sufficient strength in the direction A to absorb the impact energy of any ice that is released from the fan blades. However, its strength in the direction B is not sufficient to affect significantly the trajectory of a released fan blade, and so its presence will not interfere with the correct operation of the containment system.

Although the invention has been described in particular embodiments, a skilled person will recognise that various modifications are possible without departing from the concept of the invention.

For example, the honeycomb 445, 545 may be made of titanium, plastic or steel rather than aluminium, or of any other suitable material.

The angle of the cell walls 446, 546 of the honeycomb 445, 545 will be chosen, in a particular embodiment, to correspond to the expected trajectory of ice released from the blades.

Because the blades rotate in use, any released ice will also have a component of velocity in the circumferential direction. It may therefore be desirable also to angle the cell walls 446, 546 in the circumferential direction, so that they align with the trajectory of any released ice in the circumferential, as well as in the axial, direction.

The invention claimed is:

1. A liner panel for an annular fan casing of a gas turbine engine, the engine including a plurality of generally radially-extending fan blades that are located radially inward of the fan casing and, in use, rotate about an axis concentric with the fan casing, wherein, in use, ice may be released from a fan blade in a first direction, the first direction forming a first angle with a radial direction of the engine, and wherein, in use, a fan blade or part of a fan blade may be released in a second direction, the second direction forming a second angle with a radial direction of the engine, the liner panel having a compressive strength greater in the first direction than in the second direction such that the released ice will be deflected by the liner panel but the released fan blade or part of a fan blade will pass through the liner panel, wherein the liner panel comprises an ice impact layer including a layer of a first honeycomb material, wherein, in use, cell walls of the first honeycomb material are aligned substantially in the first direction.

2. The liner panel as in claim 1, wherein the first angle is greater than the second angle.

3. The liner panel as in claim 1, wherein the first angle is substantially 10°.

4. The liner panel as in claim 1, wherein the first angle has both an axial and a circumferential component relative to the radial direction of the engine.

5. The liner panel as in claim 1, wherein the first honeycomb material is formed principally of aluminium.

6. The liner panel as in claim 1, wherein a compressive strength of the first honeycomb material in the second direction is less than substantially 13.8 MPa.

7. The liner panel as in claim 1, wherein a density of the first honeycomb material is less than substantially 160 kg/m$^3$.

8. The liner panel as in claim 1, further comprising an abradable layer.

9. The liner panel as in claim 8, wherein the abradable layer comprises a layer of a second honeycomb material filled with an abradable material.

10. The liner panel as in claim 9, wherein the second honeycomb material is made from aramid paper coated in phenolic resin.

11. The liner panel as in claim 9, wherein the abradable material is a closed-cell expanding syntactic epoxy.

12. The liner panel as in claim 8, further comprising a septum layer between the ice impact layer and the abradable layer.

13. The liner panel as in claim 12, wherein the septum layer is secured by adhesive to the ice impact layer and to the abradable layer.

14. A liner panel for an annular fan casing of a gas turbine engine, the engine including a plurality of generally radially-extending fan blades that are located radially inward of the fan casing and, in use, rotate about an axis concentric with the fan casing, wherein, in use, ice may be released from a fan blade in a first direction, the first direction forming a first angle with a radial direction of the engine, and wherein, in use, a fan blade or part of a fan blade may be released in a second direction, the second direction forming a second angle with a radial direction of the engine, the liner panel having a compressive strength greater in the first direction than in the second direction such that the released ice will be deflected by the liner panel but the released fan blade or part of a fan blade will pass through the liner panel, the liner panel comprising an abradable layer having a layer of a second honeycomb material filled with an abradable material, wherein a Shore D hardness of the abradable material is less than substantially 70.

* * * * *